(12) United States Patent
Dean

(10) Patent No.: US 7,064,795 B2
(45) Date of Patent: Jun. 20, 2006

(54) TEMPORAL DITHERING TO INCREASE DYNAMIC RANGE OF IMAGES IN SEQUENTIALLY ILLUMINATED DISPLAYS

(75) Inventor: John E Dean, Stormville, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 813 days.

(21) Appl. No.: 10/247,199

(22) Filed: Sep. 19, 2002

(65) Prior Publication Data

US 2004/0056983 A1    Mar. 25, 2004

(51) Int. Cl.
    *H04N 9/31*    (2006.01)
(52) U.S. Cl. ...................................................... 348/679
(58) Field of Classification Search ................ 348/678, 348/679, 687, 744, 229.1; 353/31, 34, 49
    See application file for complete search history.

(56) References Cited

U.S. PATENT DOCUMENTS

| 6,252,636 | B1* | 6/2001 | Bartlett ........................ 348/743 |
| 6,497,485 | B1* | 12/2002 | Itoh ............................. 353/20 |
| 6,747,694 | B1* | 6/2004 | Nishikawa et al. ....... 348/229.1 |
| 2002/0071140 | A1* | 6/2002 | Suzuki et al. ................ 358/455 |
| 2003/0193649 | A1* | 10/2003 | Seki ............................. 353/20 |
| 2004/0001184 | A1* | 1/2004 | Gibbons et al. .............. 353/31 |

* cited by examiner

*Primary Examiner*—Paulos M. Natnael

(57) ABSTRACT

A method of increasing image dynamic range by breaking each pixel into two or more time displaced samples that are presented to the display in synchronization with appropriate illumination.

14 Claims, 5 Drawing Sheets

TEMPORAL DITHERING TO INCREASE DYNAMIC RANGE OF IMAGES IN SEQUENTIALLY ILLUMINATED DISPLAYS

TECHNICAL FIELD

The present invention relates in general to a method of increasing the number of gray scale levels in an image and, more particularly, to a method of increasing the number of gray scale levels in an image without increasing the dynamic range of the digital to analog conversion.

BACKGROUND AND SUMMARY OF THE INVENTION

In the development of improved television systems, especially in the projection field, it has been found that reflective liquid crystal displays (LCD) or liquid crystal on silicon (LCOS) has been found to have attributes for high resolution in large screen digital displays. Because the display is fabricated on silicon, LCOS displays have the ability to create small pixel size and high-resolution. Such reflective displays have a large pixel aperture ratio which results in a smooth and continuous image especially suitable for display of natural images and video. The development of a single panel color projection video display enables the creation of a color image without the ⅔ light loss associated with a conventional color wheel system by keeping all colors on the display panel at all times.

The continuous scrolling action of differently colored stripes, usually red, green and blue, are such that as a stripe leaves the bottom of the display panel the stripe is split and discontinuously redirected to the top of the panel. Concurrently with this optical scan an electrical scan is provided which addresses the rows of pixels with a signal corresponding to the color of the light impinging on the pixel row. The sequence of light bands passing over the display panel occurs so quickly as to give the viewer an appearance of simultaneous full color.

In such video systems wherein digital video samples are converted to analog voltages, and then sampled into the pixel array, the number of gray scale levels is limited by the dynamic range of the video digital to analog conversion. The present invention is directed to overcoming one or more of the problems or disadvantages associated with the relevant technology.

In the method of this invention, the number of gray scale levels in an image is increased without increasing the dynamic range of the digital to analog conversion. In one embodiment of this method such an increase is effected by separating each pixel into two or more time-displaced samples that are presented to the display panel in synchronization with appropriate illumination. For example, the number of gray levels in a system utilizing 8-bit to 12-bit pixels can be increased from 256 steps to 4,096 steps by using an 8-bit digital to analog conversion. Such a technique would be very useful in cinema, medical and advanced CAD applications. The present invention addresses one or more of these concerns.

BRIEF DESCRIPTION OF THE DRAWINGS

In the accompanying drawings, like reference numerals indicate corresponding parts throughout, wherein.

DETAILED DESCRIPTION

Figure 1:
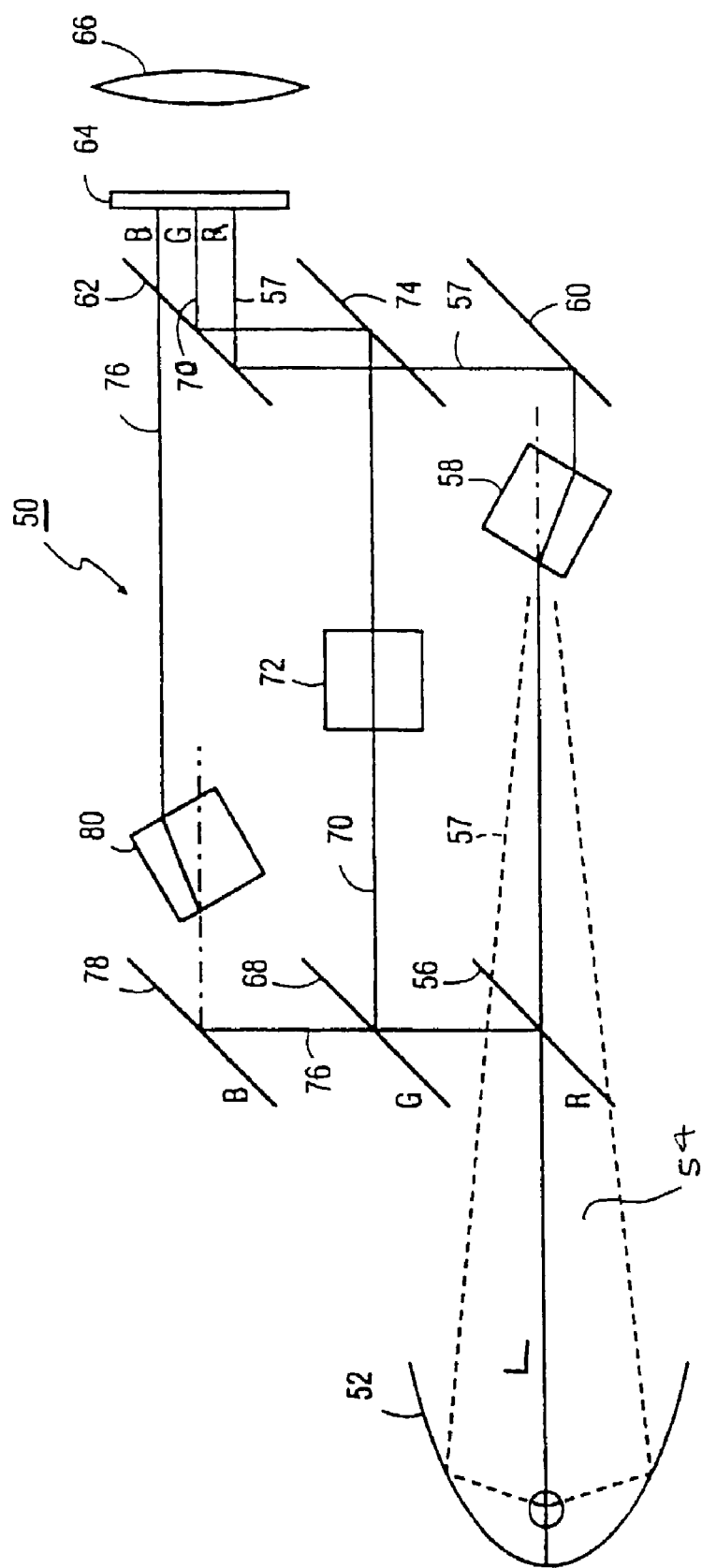
FIG. 1 is an optical schematic of a suitable single panel color projection video display system for utilizing the present invention.

Referring now to FIG. 1, there is illustrated an optical schematic of a single panel scrolling color video display system 50 in which 3 prisms 58, 72 and 80, one for each of the red, green and blue colors respectively, are non-coaxially mounted. It is to be understood that optical elements for shaping the light bands have been omitted from this illustration for purposes of clarity. Such scanning systems as illustrated are particularly useful in high illumination applications such as cinema, medical and advanced CAD applications.

The scanning system 50 includes a light source 52 which includes a reflector lamp which emits white light. The light beam 54 emitted by the lamp 52 first passes to a first dichroic splitting mirror 56 which passes red light and reflects light of other colors. A red light beam 57 which exits mirror 56 then impinges on a first rotating prism 58 which operates on red light beam 57 to scan the beam in a vertical direction. Light beam 57 then exits prism 58 and impinges upon a mirror 60 which reflects light beam 57 through a dichroic mirror 74 (which passes red light) to a dichroic re-combining mirror 62 which reflects red beam 57 to a display panel or light valve 64 which modulates the red light in accordance with the video information and passes the light in accordance therewith to a projection lense 66.

The green and blue light reflected from dichroic mirror 56 impinges upon a dichroic mirror 68 which acts to reflect green light and passes light of other colors. Accordingly, a green beam 70 is reflected by mirror 68 and impinges upon a rotating prism 72 which serves to scan green beam 70 in the direction as illustrated. The green beam 70 then passes to dichroic mirror 74 which reflects the green beam 70 to re-combining mirror 62 which reflects green beam 70 onto the LCD display panel or light valve 64.

The light beam which passes through dichroic mirror 68 forms a blue beam 76 as the red and green components have been subtracted from light beam 54 by the actions of dichroic mirrors 56 and 68, respectively. Blue beam 76 is thereafter reflected by mirror 78 to a rotating prism 80 which scans the blue beam 76 and passes the blue beam 76 to re-combining mirror 62 which passes the blue beam 76 to the display panel or light valve 64. By action of rotating prism 80 blue beam 76 is also scanned in a vertical direction.

The action of prisms 58, 72 and 80 results in a scanning of red, green and blue light bands across the display panel 64.

Figure 2:
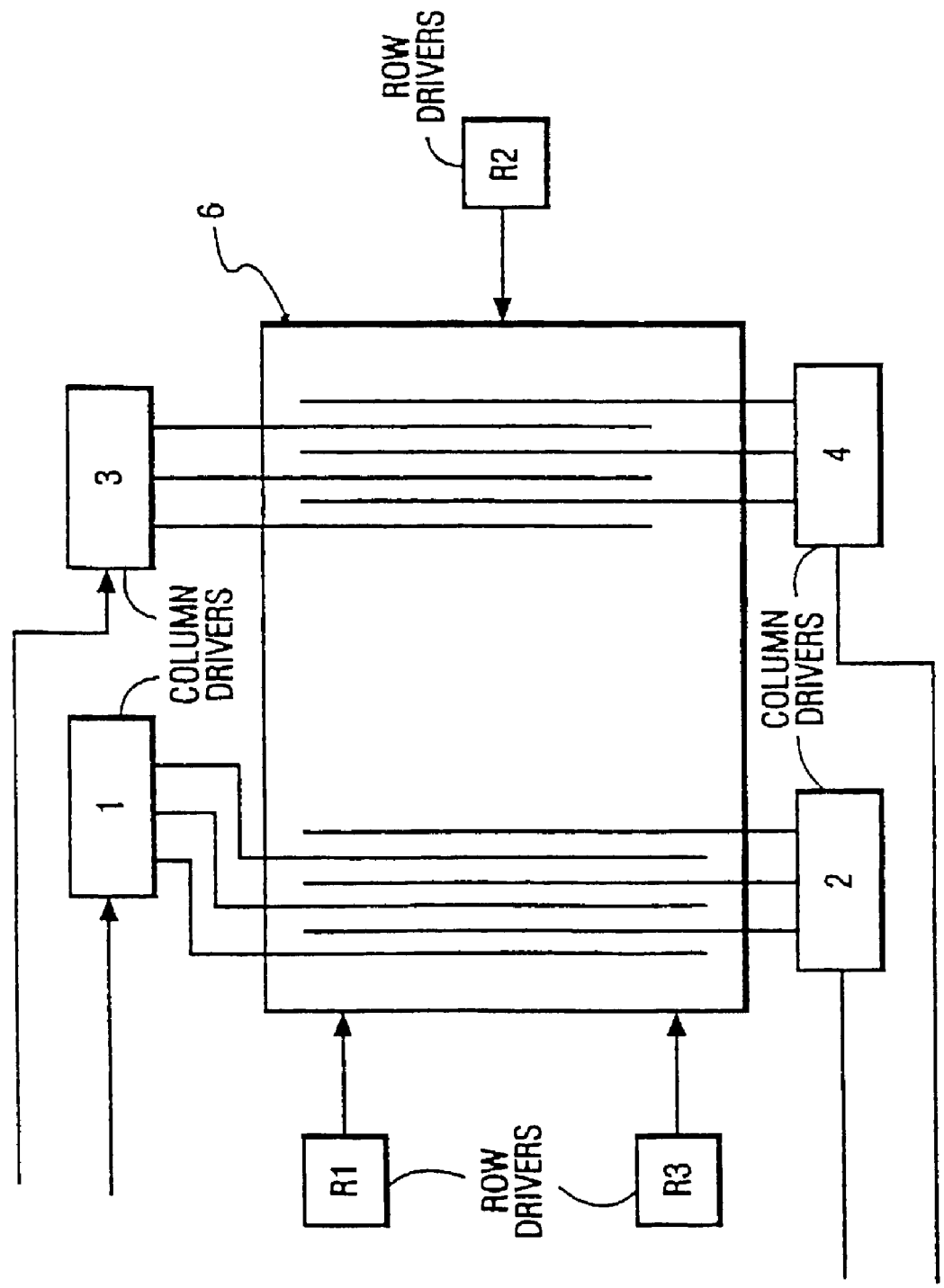
FIG. 2 is a generalized representation of the row and column drivers of a pixel array for use with this invention.

As is known in this art, in such displays the rows are addressed sequentially with all of the pixels in one row being turned on simultaneously by one of the row drivers R1, R2, R3 (FIG. 2). The individual pixels in a row are driven by a series of column drivers 1, 2, 3, and 4. The column drivers, which are basically memory devices, sample the incoming video signal and store the sampled value in the respective memory cell. With single panel color projection video display system, the 3 color bands red, green, and blue are scanned vertically over the display panel or light valve 64. During one video frame each row is illuminated by first passing red, then a green and finally a blue light band. The programming of a particular row is performed in a way that e.g. the green values are loaded before the green light band reaches this row, but after the red band has passed by. Since all 3 color bands are illuminating the panel at any one time, 3 rows have to be programmed during the time of one regular video line. This operation is performed sequentially and the programming tracks the color bands as they move over the panel 64.

Figure 3:
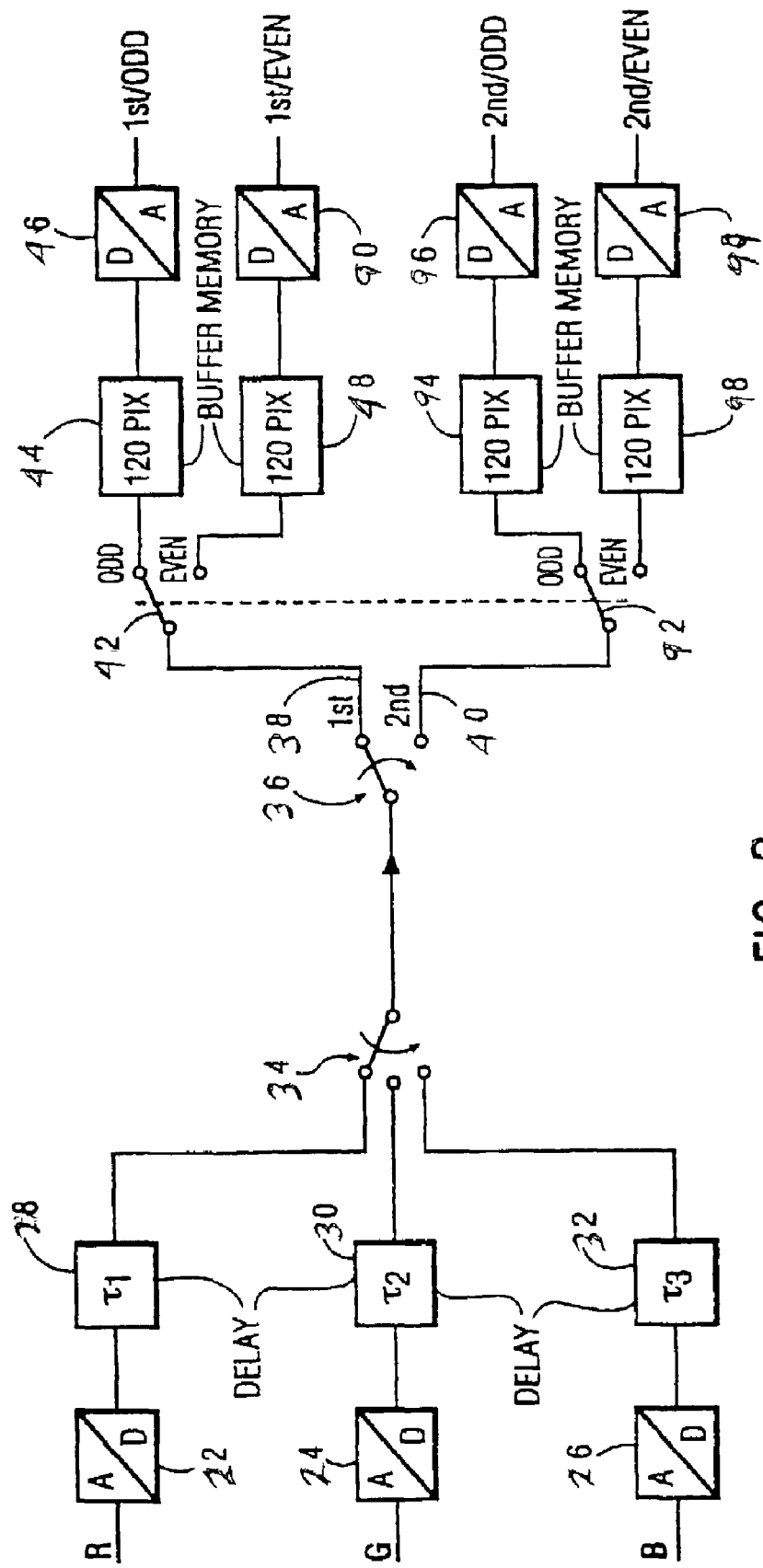
FIG. 3 is a diagrammatic representation of the signal processing for red, green and blue signals which are input to analog to digital converters.

The signal processing for the red, green and blue signals is illustrated in FIG. 3 in a diagrammatic manner. Each of the color signals is input to analog to digital (A/D) converters 22, 24 and 26 so that signal processing takes place in digital form. Thereafter the R signal is input to a first delay line 28 which will delay the red signal for a time $t_1$. The green signal is input to a delay line 30 which will delay it for a time $t_2$ and the blue line is input to a delay line 32 to delay at a time $t_3$. These times are selected according to the position and scan speed of the respective color band on the display panel 64.

The color signals then pass to a switch 34 which selects each of the outputs of the delay circuits 28, 30 and 32 sequentially so that the output of switch 34 is a serial stream with the pixels of the video lines in the aforementioned sequence. Thereafter the signals are input to a switching mechanism for applying the serialized delayed stream to the display panel 64.

The video stream passes to switch 36 which separates the video stream into first and second streams 38 and 40. The switch 36 is operated to divide the video stream into halves corresponding to the first and second half of each line. Thereafter, the output from switch 36 is connected by a line 38 to switch 42 which is operable to separate the inputs to the odd and even pixels. Input to the odd pixels is directed to a buffer memory 44 and thereafter the output of the buffer memory 44 is passed to a digital to analog converter 46 whose output is coupled to column driver 1 shown in FIG. 2. The even pixel stream is directed to a buffer memory 48 and a digital to analog converter 90 and thereafter to column driver 2 in a similar manner. The second halves of the video lines are coupled by line 40 and similarly processed by odd even switch 92 alternating between the odd and even pixels and utilizing buffers 94, 98 and D/A converters 96, 99 which, respectively, are output to column drivers 3 and 4.

To increase the number of gray levels in such a video system, or in a monochrome imaging system, e.g. from 256 steps to 4096 steps (an 8-bit to 12-bit pixels array using an 8-bit digital to analog (D/A) conversion), the upper 8-bits of each pixel is first converted to an analog voltage and applied to each pixel location. The addressed pixel location is then illuminated with full intensity light. The lower 4-bits of each pixel are then converted to (full scale) analog voltage which is applied to each pixel, sampled, and the array illuminated with ¹⁄₂₅₆ intensity light. An alternative method would be to convert the lower 4-bits of each pixel at a level less than full scale and increase the intensity of the illumination proportionally. This same technique can be applied to monochrome or color images. The frame rate should be sufficiently high to avoid flicker or other temporal artifacts.

Figure 4:
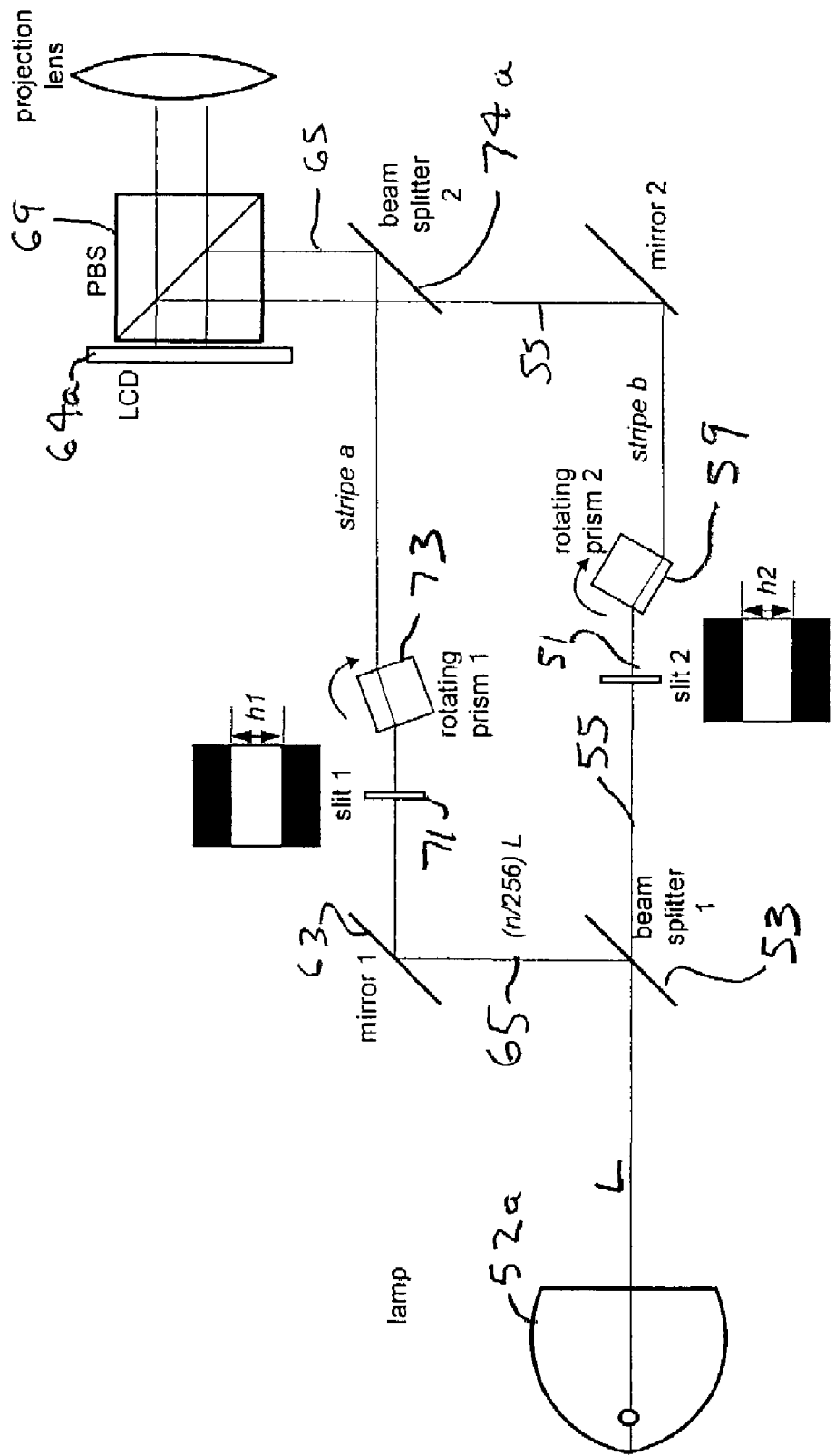
FIG. 4 is an optical diagram of a two-stripe monochrome system for utilizing the present invention.
Figure 5:
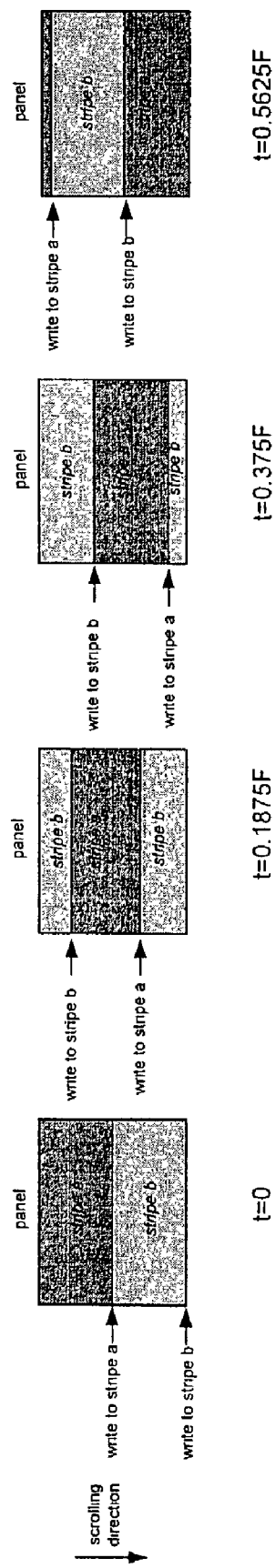
FIG. 5 is an illustration of the manner in which the stripes of the optical system illustrated in FIG. 4 will appear on a display panel.

To better explain the method of this invention, reference is made to the optical diagram of FIG. 4 and the attendant scanning of the stripes onto a display panel or light valve 64a as illustrated in FIG. 5. Because the method of this invention can be used for both color or monochrome images, for convenience of illustration a two-stripe monochrome system will be utilized for reference. It is to be understood, however, that a system as described with reference to FIGS. 4 and 5 could be used for each of the three colors Red, Green and Blue.

Similar to the color imaging system illustrated in FIG. 1, a light source 52a, which includes a reflector lamp which emits white light, is passed to a beam splitter 53 whereby the beam splitter 53 transmits (m/256) L in a first light path 55 and reflects (n/256) L in a second light path 65 to a mirror 63, wherein n+m=256, preferably n=1 and m=255.

The dim light (n/256) L is passed from the mirror 63 in the light path 65 through a slit 71 into a rotating prism 73. The (m/256) L light is passed along light path 55 through a slit 51 and into a rotating prism 59. Thereafter, the light beams will pass through or be redirected by beam splitter 74a, to a polarizing beam splitter 69 and display panel 64a.

The height of the respective stripes (n/256) L and (m/256) L is determined by the light passing through the slits 71 and 51, respectively. Preferably the height will be one-half the height of the display panel.

Rotating prims 73 and 59 are phase shifted such that they cause the dim stripe (n/256) L to scroll down the display panel 180 degrees out of phase with the bright stripe (m/256) L. Accordingly, assuming no overscan (overscan=0%) the two stripes will scroll down the panel 180 degrees out of phase, and light will always be in the panel, as illustrated in FIG. 5.

While the size of each prism face will determine the amount of overscan onto the display panel, and for purposes of simplicity no overscan has been described above, a more realistic example would be to provide an approximately 5% overscan to allow for component tolerance for preventing stripe overlaps and to provide a black gap between stripes for writing data. As illustrated, video addressing for each stripe is addressed to the display panel just ahead of the leading edge of each stripe.

For an illustrative example, assume the bright stripe has a luminance of (255/256)k L and the dim stripe has a luminance of (1/256) k L, and the required dynamic range of each pixel is 12-bits. If it is desired to update a pixel in row X, column Z, with a 12-bit value of 47A hexadecimal, then when the front edge of the bright stripe reaches row X, column Z is updated with an analog value equivalent to the upper 8-bits of the pixel, or 47 hex. When the front edge of the dim stripe reaches row X (a half frame later), column Z is updated with an analog value equivalent to the lower 4-bits of the pixel, or A hex. Accordingly, when integrated by the human eye over a frame time, the pixel appears as a 12-bit value, 47A hex.

FUNCTIONAL DESCRIPTION

In operation, the present invention increases the number of gray scale levels in an image without increasing the dynamic range of the digital to analog conversion applied to the pixels of an image display panel. The increase in a video system, either color or monochromatic, from 256 steps to 4096 steps, an 8-bit to 12-bit pixel array using an 8-bit D/A conversion, first converts the upper 8-bits of each pixel to an analog voltage applied to each pixel location. The addressed pixel location is then illuminated with substantially full intensity light. The lower 4-bits of each pixel are subsequently converted to full scale analog voltage which is applied to each pixel sampled, and the array illuminated approximately 180 degrees out of phase with the initial scroll with 1/256 intensity light. When integrated by the human eye over a frame time, the pixel appears as a 12-bit value.

An alternative method of increasing the gray scale level would be to convert the lower 4-bits of each pixel at a level less than full scale, and increase the intensity of the illumination proportionally.

Other aspects and features of the present invention can be obtained from a study of the drawings, the disclosure, and the appended claims.

The invention claimed is:

1. A method of increasing an image dynamic range of a pixel system by breaking each pixel into time displaced samples, comprising the steps of:
    providing a source of light L and splitting said light into a first band of luminance and a second band of luminance;
    sweeping said first band across a light valve;
    addressing said light valve with a first video information synchronous with the sweeping of said first band;
    sweeping said second band across said light valve approximately 180 degrees out of phase with said first band; and
    addressing said light valve with a second video information synchronous with the sweeping of said second band.

2. The method of claim 1 wherein said pixel system is a 12-bit pixel system.

3. The method of claim 2 wherein said luminance of said first band is (255/256) L and the luminance of said second band is (1/256) L.

4. The method of claim 1 wherein the luminance of said first band is greater than the luminance of said second band.

5. The method of claim 1 wherein addressing of said light valve occurs just prior to a leading edge of said bands.

6. The method of claim 1 wherein the luminance of said first band is proportional to the luminance of said second band.

7. A video display pixel conversion system comprising:
    a source of bands of light L, said bands of light being separated from each other;
    light valve means for receiving said bands of light in accordance with an input video signal;
    means for moving a first one of said bands of light sequentially across said light valve means;
    means for moving a second one of said bands of light across said light valve means approximately 180 degrees out of phase with said first one of said bands of light; and
    means for addressing said light valve means with video information corresponding to the luminance of the light band imaging thereon so that said first one of said bands of light is received by said light valve means synchronous with a first video information and said second one of said bands of light is received by said light valve means synchronous with a second video information to combine the outputs thereof on said light valve means.

8. The video display pixel conversion system wherein said pixel system is a 12-bit pixel system, said first one of said band of light has a luminance of (m/256) L and said second one of said bands of light has a luminance of (n/256) L, where m+n=256.

9. The video display pixel conversion system of claim 8 wherein said first one of said bands of light is synchronous with an upper 8-bits of video information and said second one of said bands of light is synchronous with a lower 4-bits of video information.

10. The video display pixel conversion system of claim 7 wherein said means for moving said bands of light comprises at least one rotating prism for moving said bands of light approximately 180 degrees out of phase with each other over said light valve means.

11. The video display pixel conversion system of claim 10 further including a light beam splitter positioned to divide and direct a beam of light to said rotating prism.

12. The video display pixel conversion system of claim 10 further including mean for forming a stripe of a predetermined height across said light valve means.

13. The video display pixel conversion system of claim 7 wherein said first and second bands of light are overscaned approximately 5%.

14. The video display pixel conversion system of claim 7 wherein means for addressing said light valve means addresses said light valve means just ahead of a leading edge of each one of said first and said second bands of light.

* * * * *